United States Patent [19]

Boehler

[11] 4,237,877
[45] Dec. 9, 1980

[54] PROTECTIVE ENVIRONMENTAL MASK WITH THERMOELECTRIC AIR CONDITIONING SYSTEM

[76] Inventor: Gabriel D. Boehler, 3010 Ordway St., NW., Washington, D.C. 20008

[21] Appl. No.: 5,622

[22] Filed: Jan. 22, 1979

[51] Int. Cl.³ .................. A62B 7/00; A62B 7/10; A62B 7/14
[52] U.S. Cl. ............. 128/204.15; 128/203.29
[58] Field of Search ............ 128/142.7, 142.5, 142 R, 128/142.3, 141 R, 192, 204, 212, 402, 146.7, 142.4, 204.15, 204.17, 203.29

[56] References Cited

U.S. PATENT DOCUMENTS

| | | | |
|---|---|---|---|
| 3,085,405 | 4/1963 | Frantti | 128/402 X |
| 3,496,703 | 2/1970 | MacLeod et al. | 128/142.7 X |
| 3,911,914 | 10/1975 | Johansson | 128/142.7 |
| 3,935,861 | 2/1976 | Warncke | 128/146.7 X |

Primary Examiner—Henry J. Recla
Attorney, Agent, or Firm—Marvin Reich

[57] ABSTRACT

The present invention relates to a protective environmental mask connected to an air conditioning unit. The unit includes a blower, filters connected downstream of said blower, and a thermoelectric temperature controller connected downstream of said filters. The unit also includes controls for regulating air characteristics such as temperature, humidity and air flow. The unit further includes a tank for collecting moisture from the air passing through the thermoelectric temperature controller and a pumping circuit for subsequently pumping and spraying the condensate to the interior of the mask for an additional cooling effect by small sprayed water flows on adequate areas of the head.

8 Claims, 7 Drawing Figures

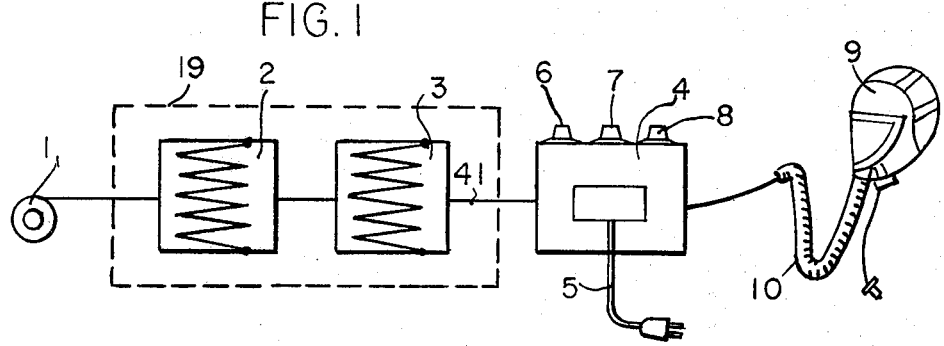
FIG. 1
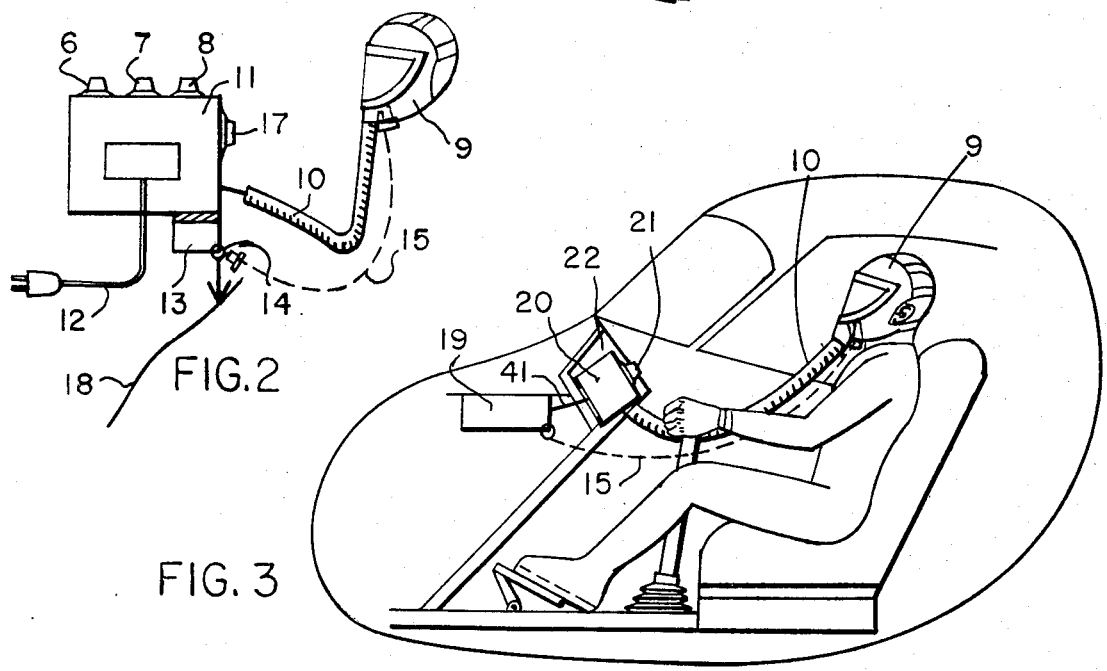
FIG. 2
FIG. 3
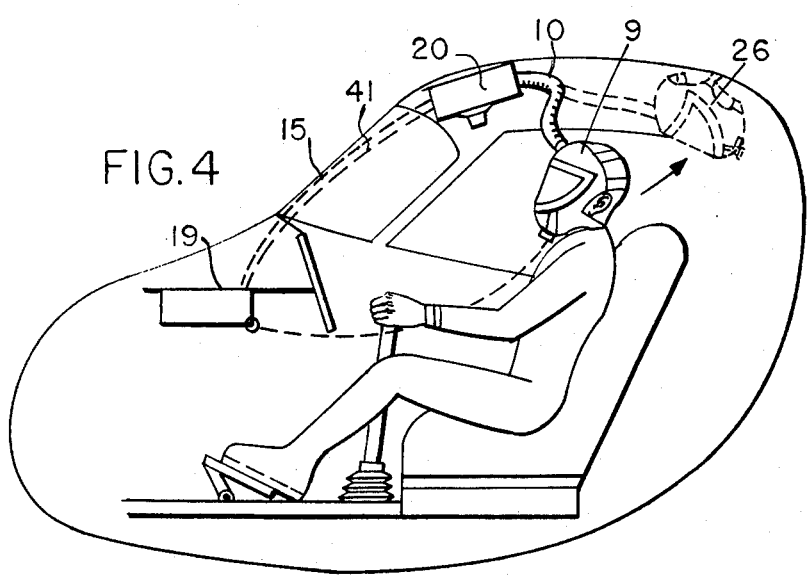
FIG. 4

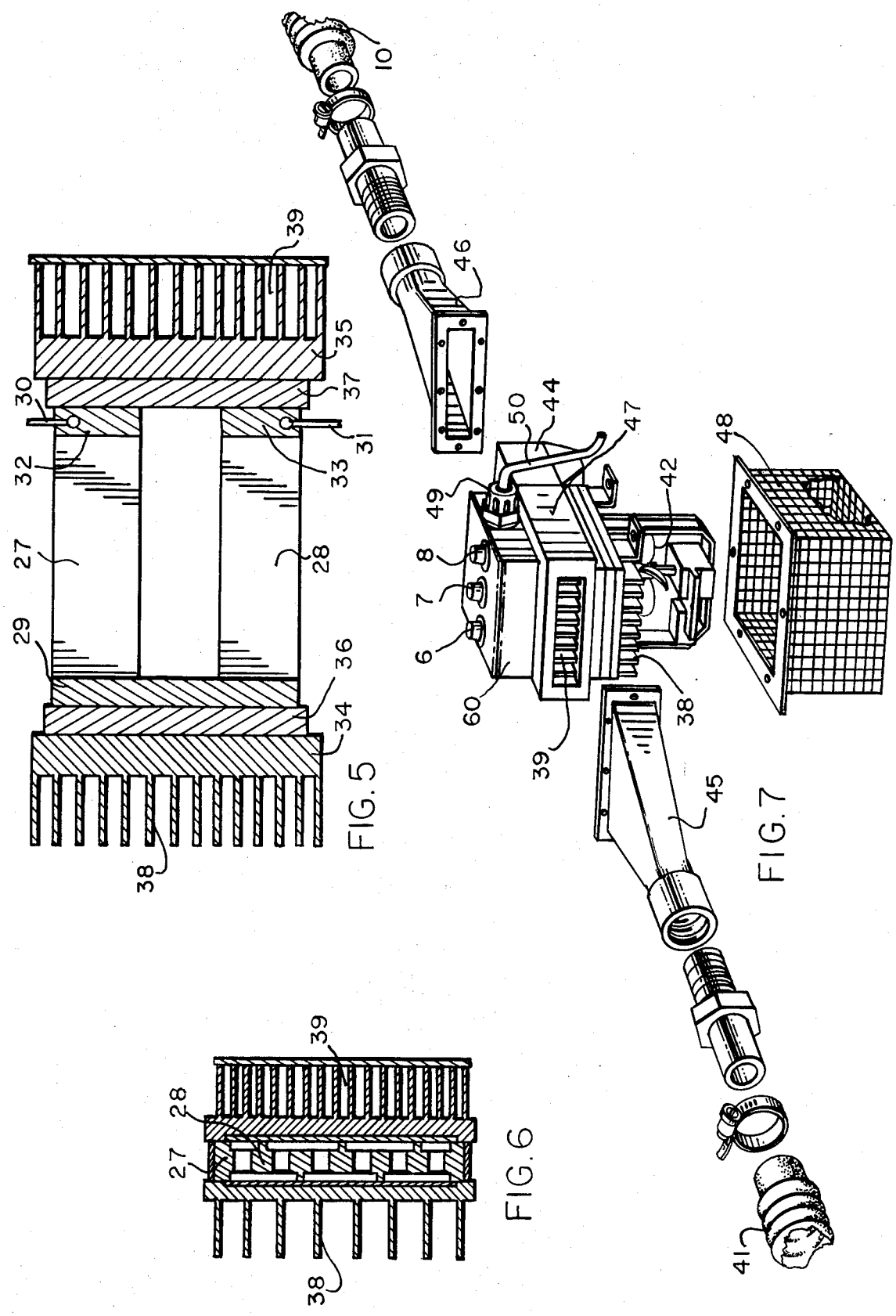

PROTECTIVE ENVIRONMENTAL MASK WITH THERMOELECTRIC AIR CONDITIONING SYSTEM

BACKGROUND OF THE INVENTION

1. Field of the Invention

This invention relates to an individual mask equipped with a supply system of air, cooled or heated, this air being prepared by a thermoelectric device.

The purpose of the invention is the comfort and, in certain cases, the protection against environmentally bad conditions of drivers, operators, mechanics, etc. placed in vehicles or aeronefs, as for example:

Drivers of civil works machines, bulldozers, graders, circulating in very hot or very cold areas, with some dusty or polluted conditions coming from the civil works, as blasting of rocks or from the local climate, as sand storms.

Operators inside control cabins of cranes in factories like foundries, steelworks plants, storage of chemical products.

Drivers and operators inside vehicles or aeronefs of the Army, the Navy, the Air Force, when the environment is spoiled by the climatic conditions, plus some specific pollutants aggression coming from the activity of the arms, guns, rockets, and all types of explosion gases, including some gases nuclearly contaminated.

Firemen in or out of their trucks.

2. Description of the Prior Art

To protect the crewmen of these machines, usually, it is proposed and it is realized to make their room as tight as possible, and to supply to this room a sufficient delivery of hot or cold air to assure at least minimal conditions of comfort and safety.

This method requires the treatment of large quantities of air compared with the needs of the men which are often a small fraction of the required needs for the entire room. This type of air conditioning unit is more often powerful, from 2 to 4 HP, and the power requirements, as fuel or electricity requirements, plus the weight and size of units are an obstacle against the use of these systems in many cases.

It has also been proposed to place the crewmen in a complete protective garment in which the men are protected from feet to head as shown in Frantti U.S. Pat. No. 3,085,405. This process reduces the requirements of the air conditioning equipment and, especially, static processes may be used, such as thermoelectric systems, to supply cool air to the garment.

But the crewmen seem embarrassed to wear a garment, this garment cannot be removed easily when it is not useful due to a change to better environmental conditions or a change in the mission of the crewmen.

The garment is also exposed to leakage and the man may be endangered by losses of air by this leakage.

SUMMARY OF THE INVENTION

It has now been demonstrated that the important features in this technique is the great role of the air conditioning around the head of the men working or fighting in such difficult conditions.

If the air supply is to a mask surrounding the head and a part of the neck, the air being at adequate thermal and humidity characteristics, the comfort and safety requirements of man are satisfied.

The head is the most important part of the body and common sense is in agreement with human behavior in aggressive environment. With an air conditioned mask, the individual knows and feels that his eyes, nose, mouth and ears are protected and are placed in quasi normal condition. The psychological and physiological effects of air conditioning limited to the head are comparable to those of a complete garment supplied by conditioned air.

It is known that a small quantity of dry fresh air, arriving with small fine drops of water, around the ears and on the nape of the neck, provides a substantial feeling of comfort.

The invention is also related to a mask in which some sprayed water is distributed on the head with the fresh dry air to create this desirable feeling of comfort, whatever the external conditions may be.

The advantages of the air conditioning limited to the mask are the following:

The thermal requirements are a small fraction of the requirements of the whole garment being air conditioned and a very small fraction compared to the room or cabin air conditioning unit.

The equipment may be compact, light and yet it may be locally more powerful, efficient and effective than any prior art system.

The reduction of the power input makes easily possible the use of a thermoelectric device. The electricity consumption is small and may be supplied by an emergency source.

The crewmen may easily remove the mask, if the environmental or working conditions are sufficiently improved whereby the use of the mask is not required. A garment is not so easily removed.

The present invention is related to a mask, in which the supply air comes from a small unit, comprising essentially a thermo-electric heat pump, a fan, and, if required by the exigencies of the operating conditions, some normal or special filters. Normal filters are those eliminating dust, as sands, or fertilizers, or earth dust formed by explosions. Special filters are those eliminating exceptional pollutants, as smoke from fire in chemical plants, or nuclear compounds coming from accident in a nuclear power plant, or from military action in the battlefield, if nuclear weapons are used. An over pressure can be applied to the air in the mask to permit escape thereof for cooling of neck and ears of the wearer.

BRIEF DESCRIPTION OF THE DRAWINGS

FIG. 1 is a schematic representation of a system according to the present invention;

FIG. 2 is a view of a portion of the system of FIG. 1 showing an additional feature;

FIG. 3 is a representation of a typical use of the present invention;

FIG. 4 is a representation as in FIG. 3 showing storage of extra masks;

FIG. 5 is a conceptional view of parts of the thermoelectric unit in accordance with the present invention;

FIG. 6 is a view as to FIG. 5 but in correct proportion; and

FIG. 7 is an exploded view of a complete thermoelectric unit in accordance with the present invention.

DESCRIPTION OF THE PREFERRED EMBODIMENT

FIG. 1 represents the essential components of the unit wherein a fan 1 supplies the raw air to a prefilter 2 which is acting as the normal filter. The output of filter 2 goes to a special filter 3 which is optionally provided, if necessary. A thermoelectric unit 4 is supplied with electricity by plug 5. Some control buttons 6, 7 and 8 are handled by the crewman to adjust the characteristics of the air supplied to the mask 9 by duct 10 such as temperature, cold or warm, quantity, humidity, etc. The air from filter 3 is therefore controlled by unit 4 prior to entry into duct 10 of mask 9.

FIG. 2 represents an improvement comprising a capture of water condensed on the cold fins 11 of the thermoelectric device 4, supplied with electricity by plug 12.

The condensed water is gathered in a small tank 13, pulsed by a small pump 14 and led through duct 15 into the mask 9 where it is sprayed as required.

The effect of this sprayed water may be controlled by the driver or crewman by a button 17 additional to 6, 7 and 8.

When the condensed water is not used, it is eliminated by the pipe 18.

FIGS. 3 and 4 represent a typical application of the invention for a helicopter pilot. The filters 2 and 3 and the fan 1 are placed in a box as presented by item 19. The thermoelectric unit 20 and its control buttons 21 are placed on the control panel 22. The hose 10 supplies air to mask 9.

In FIG. 4, the components 19 are placed in the same way as in FIG. 3, the filtered air being supplied to the thermoelectric device 20 placed above the head of the pilot whose mask 9 is supplied with air by duct 10. The condensed water is taken to the mask through hose 15. The mask, when not in use, and spare masks are stored at 26.

The following is related to the description of the proposed thermoelectric heating/cooling unit:

The thermoelectric element itself is shown conceptually in FIG. 5; the proposed configuration in correct proportion is shown in FIG. 6. The unit is composed essentially of one or several thermoelectric devices using the Peletier effect (FIG. 5). Each device has two legs 27 and 28 of specially chosen dissimilar metals (these metals and the Peletier effect being well known), connected electrically to one another by conductor 29 and to an external direct current source by the wires 30 and 31 through conductors 32 and 33 respectively. Heating or cooling takes place at the junction of legs 27 and 28, depending upon current direction as is well known. These legs are electrically insulated from but thermally connected to two end pieces 34 and 36 by the intermediary of two elements 36 and 37. When a direct current of a given polarity is supplied to the system, part 34 becomes cold and part 35 becomes relatively hot. When the polarity of the direct current is reversed, part 34 becomes hot and part 35 becomes relatively cold. For effective use of the process, parts 34 and 35 must be equipped with heat transfer surfaces, for example with fins shown as 38 and 39. Water and/or air flows through the fins to remove the heat (or the cold) to obtain the desired cold effect (or a warm effect) on the operative side. FIG. 6 shows the true dimensions of the proposed thermoelectric module, which actually has very short legs and is flat.

An apparatus embodying the thermoelectric devices described in FIG. 5 and denoted as units 4 and 20 above is shown in FIG. 7. The proposed unit will either heat or cool and dehumidity the filtered air provided to the crew's masks. The numbering of components on FIG. 7 corresponds to that of FIG. 5.

FIG. 7 shows, on the left, air coming from the filters through hose 41, being cooled (or heated) by passage through the fins 39 and being further piped to the crewman's mask through the hose 10. To control the humidity, a water droplet separator 44 is placed downstream of the fins, so that water condensed during the cooling is removed before the conditioned air is delivered to the crewman's mask. Heat will be removed from the unit by air discharged by blower 42 and passing through the fins 38. By the same process, air supplied by hose 10 to the crewman may be heated by the unit, the sense of direct current being changed by the individual crewman actuating the electrical selector switch 6. Transition pieces 45 and 46 are included to provide a smooth transition for the airflow from hose 41 to heater/cooler unit 47 and from separator 44 to hose 12. A wire mesh basket 48 is provided to protect the blower 42.

An electrical box 60 is mounted on top of the unit 44. It receives power from the DC power supply through an electrical connector 50. It also incorporates three controls, 6 the selector switch to turn the unit on in either the heating or cooling mode, 7 a rheostat controlling the current intensity, hence the thermal intensity and 8 to modulate the delivery of the air to duct 10.

The crewman can operate all three controls 6, 7 and 8 and achieve the following:
(1) Unit turned on/off
(2) cooling
(3) heating
(4) increase or decrease of cooling/heating effect
(5) increase or decrease of airflow to the mask.

Humidity control can be effected by the appropriate combination of functions 2, 4 and 5 above, and also by the possibility of an injection of a fine spray of water as described before.

The air conditioning system, as explained before, may be completed by a spray water system entering the mask in the appropriate location, giving to the driver or crewman the possibility to enjoy an additional cooling effect as described before.

The air condition system, as described above, being limited to an air preparation system plus a mask, may be portable, the energy source being a battery or a mobile electric wire.

This invention constitutes an important improvement on existing systems. The air conditioning unit described above can give an individual crewman an air supply totally controlled in temperature and humidity by the crewman himself. It can be installed in an armored vehicle with a minimum of changes. Alternatively, the unit may be used in a centralized system or the unit may be mobile and portable.

Though the invention has been described with respect to a specific preferred embodiment thereof, many variations and modifications will immediately become apparent to those skilled in the art. It is therefore the intention that the appended claims be interpreted as broadly as possible in view of the prior art.

What is claimed is:

1. A protective environment mask system comprising:
   (a) a mask which fits onto the head of a wearer and adapted to cover a substantial portion of the face of a wearer and including means for providing a substantial airtight fit with the head of said wearer, (b) temperature control means which operates in accordance with the Peletier principle for cooling fluid, wherein said control means includes means for retaining water condensed therein and means for pumping and spraying said condensed water into said mask, (c) means for pumping breathable fluid through said control means, and (d) means for coupling said control means to said mask to deliver said breathable fluid from said control means into said mask.

2. A mask system as set forth in claim 1 wherein said means for pumping produces pressure in said mask sufficient to cause said fluid to pass through said mask at at least one of the wearer's neck and ears.

3. A mask system as set forth in claim 2 further including means to control current direction and means to control current intensity through said temperature control means.

4. A mask system as set forth in claim 2 further including filter means in the path of said breathable fluid between said means for pumping and said mask.

5. A mask system as set forth in claim 4 further including means to control current direction and means to control current intensity through said temperature control means.

6. A mask system as set forth in claim 1 further including filter means in the path of said breathable fluid between said means for pumping and said mask.

7. A mask system as set forth in claim 6 further including means to control current direction and means to control current intensity through said temperature control means.

8. A mask system as set forth in claim 1 further including means to control current direction and means to control current intensity through said temperature control means.

* * * * *